(12) United States Patent
Da Costa et al.

(10) Patent No.: US 11,614,283 B2
(45) Date of Patent: Mar. 28, 2023

(54) SLAG DOOR FOR A MELTING FURNACE

(71) Applicant: DANIELI & C. OFFICINE MECCANICHE S.P.A., Buttrio (IT)

(72) Inventors: Paulo Da Costa, Buttrio (IT); Franco Scotti, Monfalcone (IT); Paolo Burin, Tricesimo (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 202 days.

(21) Appl. No.: 16/833,363

(22) Filed: Mar. 27, 2020

(65) Prior Publication Data

US 2020/0309456 A1 Oct. 1, 2020

(51) Int. Cl.
*F27D 3/15* (2006.01)
*F27D 25/00* (2010.01)

(52) U.S. Cl.
CPC ......... *F27D 3/1545* (2013.01); *F27D 3/1536* (2013.01); *F27D 25/001* (2013.01)

(58) Field of Classification Search
None
See application file for complete search history.

(56) References Cited

U.S. PATENT DOCUMENTS

| | | | | |
|---|---|---|---|---|
| 2007/0290420 | A1* | 12/2007 | Wunsche | F27D 1/18 266/271 |
| 2011/0038391 | A1* | 2/2011 | Miani | F27D 3/1536 373/71 |
| 2014/0265066 | A1* | 9/2014 | Newman, Jr. | F27D 25/001 266/135 |
| 2020/0309456 | A1* | 10/2020 | Da Costa | F27D 25/001 |

FOREIGN PATENT DOCUMENTS

| | | |
|---|---|---|
| WO | WO-2007/147248 A1 | 12/2007 |
| WO | WO-2010/094584 A1 | 8/2010 |
| WO | WO-2013/150421 A1 | 10/2013 |

* cited by examiner

*Primary Examiner* — Scott R Kastler
(74) *Attorney, Agent, or Firm* — Marshall, Gerstein & Borun LLP

(57) ABSTRACT

A slag door for a melting furnace for the production of steel is suitable to be associated with an aperture provided in a lateral wall of the melting furnace and to cooperate with a slag channel provided inside the melting furnace itself.

17 Claims, 3 Drawing Sheets

SLAG DOOR FOR A MELTING FURNACE

FIELD OF THE INVENTION

Embodiments described here concern a slag door for a melting furnace.

In particular, the slag door according to the present invention is used in association with a metal melting furnace to allow the selective discharge of at least part of the slag layer produced during the melting processes for producing steel.

BACKGROUND OF THE INVENTION

A common metal melting furnace, for example of the electric arc type, essentially comprises a shell for containing the molten steel, a covering vault equipped with an openable cap, electrodes that drop through the vault and a suction plant for the fumes.

An arc furnace normally comprises a slag door, typically positioned on the vertical wall of the shell, and communicating with the inside of the furnace through a tunnel, or slag channel, lined with refractory material (and/or with cooling elements). The slag door is mainly used to extract the slag, as well as for other activities such as loading additives and other materials useful to facilitate the process, collecting samples, measuring the temperature, inserting burners and oxygen and/or carbon injectors as well as inspecting the inside of the furnace.

In addition to the premature exit of slag, or of scrap during the process, one of the problems that are found in the melting processes in this type of furnaces is that the slag tends to accumulate in the tunnel, or in correspondence with the threshold of the slag door, or it also adheres to the door itself, creating encrustations and deposits that hinder the extraction of the slag or the insertion through the door of material useful for the melting process.

This can cause an incorrect functioning and an incorrect and incomplete closure of the slag door, causing possible air infiltrations following the depression acting inside the shell, with a consequent lower efficiency of the furnace, since the slag and the electrodes thus tend to oxidize more. In addition, this can cause possible safety hazards for operators following splashes or explosions.

There are several known solutions that provide methodologies to clean the tunnel and/or the slag door.

One solution, for example, provides the direct intervention of an operator by means of suitable slag removal means, for example by means of motorized means equipped with suitable brushes configured to enter the slag door once opened. This solution is very dangerous for the operator and it often has to be carried out only after an adequate cooling of the slag, so as to not increase the safety hazards for the operator. However, sometimes, the removal of the slag has to necessarily be carried out with the furnace active, thus causing the problems and risks indicated above. This solution also increases the downtime between one charge of scrap into the furnace and the next, causing an increase in costs and a decrease in productivity.

There are also automated solutions that provide openable slag doors, for example of the shutter type, and equipped with at least one cleaning element, in the form of a panel, arm or blade, which performs a clamping action of the slag door and contributes to remove the obstructions present in the tunnel. Some of these solutions are described in documents WO-2007/147248 A1 or WO-2010/094584 A1 or WO 2010/094584.

These solutions provide to drive this cleaning element when the door is open, in order to scrape the walls of the tunnel, in particular the base surface thereof, so as to remove the encrustations and obstructions generated by the slag. However, this action may not completely eliminate the encrustations, and at the same time tends to weaken and remove the lining of refractory material of the tunnel until it causes an at least partial detachment of the refractory material itself. Furthermore, following this removal of material, the slag door may not close completely in subsequent cycles, leaving gaps which, expanding in subsequent operative cycles, can compromise the correct functioning of the furnace.

Consequently, these solutions tend to reduce the efficiency of the furnace and increase maintenance costs, as well as reduce productivity due to possible frequent maintenance interventions.

There are also solutions that tend to preserve the refractory material of the tunnel by scraping the base surface of the tunnel itself superficially and in a controlled manner. An example of such solutions is described in document WO-2013/150421 A1, in which a vibrating and oscillating shutter panel is provided which scrapes the encrustations present on the base surface of the tunnel.

However, these solutions may not ensure a complete cleaning and unblocking of the tunnel and of the slag door, making further cleaning interventions necessary.

Furthermore, known solutions are generally difficult to install in or remove from the melting furnace, and can have a bulk that hinders the operations of removing the slag, inserting additive materials and sampling.

Another disadvantage of known solutions is that the cleaning element, in the non-operating position with the door open, tends to dispose itself in the bulk of the aperture of the furnace, with the consequence that it can be contaminated by the slag that is discharged, thus requiring further cleaning and maintenance interventions.

There is therefore the need to perfect a slag door for the removal of slag from a melting furnace which can overcome at least one of the disadvantages of the state of the art indicated above.

In particular, one purpose of the present invention is to provide a slag door that can be easily opened and closed in an automated manner, allowing for example to load additives and materials, collect samples, measure the temperature, insert burners and oxygen injectors, as well as inspect the interior of the furnace and remove the slag and encrustations present at the level of the tunnel and of the slag door.

Another purpose of the present invention is to provide a slag door which allows a complete sealing of the shell of the melting furnace, so as to guarantee its correct functioning even with a sequence of successive cycles to discharge the slag.

Another purpose is to provide a slag door which allows to remove the slag safely and without downtime, increasing the productivity of the melting furnace and the safety of the operators.

Another purpose is to provide a slag door that guarantees high efficiency of the melting furnace by reducing maintenance interventions and simplifying the operations of cleaning and removing the encrustations and obstructions present at the slag door or tunnel level.

Another purpose of the present invention is to provide a slag door that can be easily installed on any melting furnace guaranteeing a correct, selective and easy accessibility toward the inside of the melting furnace.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the invention or variants to the main inventive idea.

In accordance with the above purposes, a slag door for a melting furnace for the production of steel, in accordance with the present invention, is suitable to be associated with an aperture provided in a lateral wall of the melting furnace and to cooperate with a slag channel provided inside the melting furnace itself.

The slag door comprises:

a frame on which a sliding closing panel is mounted, configured to selectively assume a lowered position to close the slag channel, in which a lower part of the closing panel substantially abuts on a base surface of the slag channel, and a raised position to open the slag channel in which the closing panel is partly or completely raised;

a slag removal device, mounted on the frame and mobile with respect to it, provided at least with a cleaning arm having at its end a cleaning element configured to be moved, along a working axis, inside the slag channel when the closing panel is in the opening position; the slag removal device has a working operating position, when the sliding closing panel is located in the raised opening position, in which the cleaning element can move until it penetrates through the aperture of the melting furnace along the slag channel and exerts its cleaning and descaling action of the slag present in the slag channel, and an inactive operating position in which it is raised and outside the bulk of the aperture of the melting furnace. In this way, the slag removal device is not dirtied or contaminated by the slag during the step of extracting it from the furnace, therefore it does not require additional cleaning and maintenance operations.

In one embodiment, the connection between the slag removal device and the frame is of the hinge type. In particular, the cleaning arm can be hinged to a suitable portion of the frame in order to allow its movement from the working operating position to the inactive operating position, and vice versa.

The closing panel as above, since it is provided with independent movement with respect to the slag cleaning and removal device, and since the bulk of the two movements are not interfering, can be easily opened, allowing the loading of additive materials, the collection of samples, the measurement of temperature, the insertion of burners and oxygen and/or carbon injectors, as well as the inspection of the interior of the furnace and the removal of the slag by the slag removal device.

In one embodiment, a pressure transducer is associated with the closing panel and, in the closing position, detects the pressure exerted by the lower part of the panel on the base surface of the slag channel.

This allows to guarantee a complete seal of the slag channel, since the lower part of the closing panel always abuts on the base surface of the slag channel even when the base surface as above is worn by the continuous descaling and cleaning operations.

According to another embodiment, the slag removal device is provided with a movement arm hinged with a first end thereof to the frame and with a second end thereof to the cleaning arm, thus defining a double articulation arm. It is not excluded that the arm can consist of a greater number of articulations.

Advantageously, in this solution, the slag removal device, thanks to the movement with multiple articulation, allows to have a cleaning travel that is flexible and deeper, therefore generally more effective, and therefore to reduce the intervention of operators in order to guarantee greater safety in the workplace and a decrease in downtime during one scrap melting process and the subsequent one.

A purpose of the present invention is also a melting furnace for the production of steel provided with an aperture provided in one of its lateral walls, with a slag channel associated with the aperture and extending toward the inside of the melting furnace and a slag door, in accordance with the present invention, configured to cooperate with the slag channel.

A purpose of the present invention is also a method to clean and remove slag from a slag channel of a melting furnace for the production of steel through a slag door as previously described that provides to clean and remove the slag by means of the slag removal device during the steel tapping step.

Advantageously, by removing the slag at the same time as the tapping of the steel, this method allows to reduce the downtime between one casting and the next, increasing the productivity of the melting furnace.

BRIEF DESCRIPTION OF THE DRAWINGS

These and other characteristics of the present invention will become apparent from the following description of some embodiments, given as a non-limiting example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
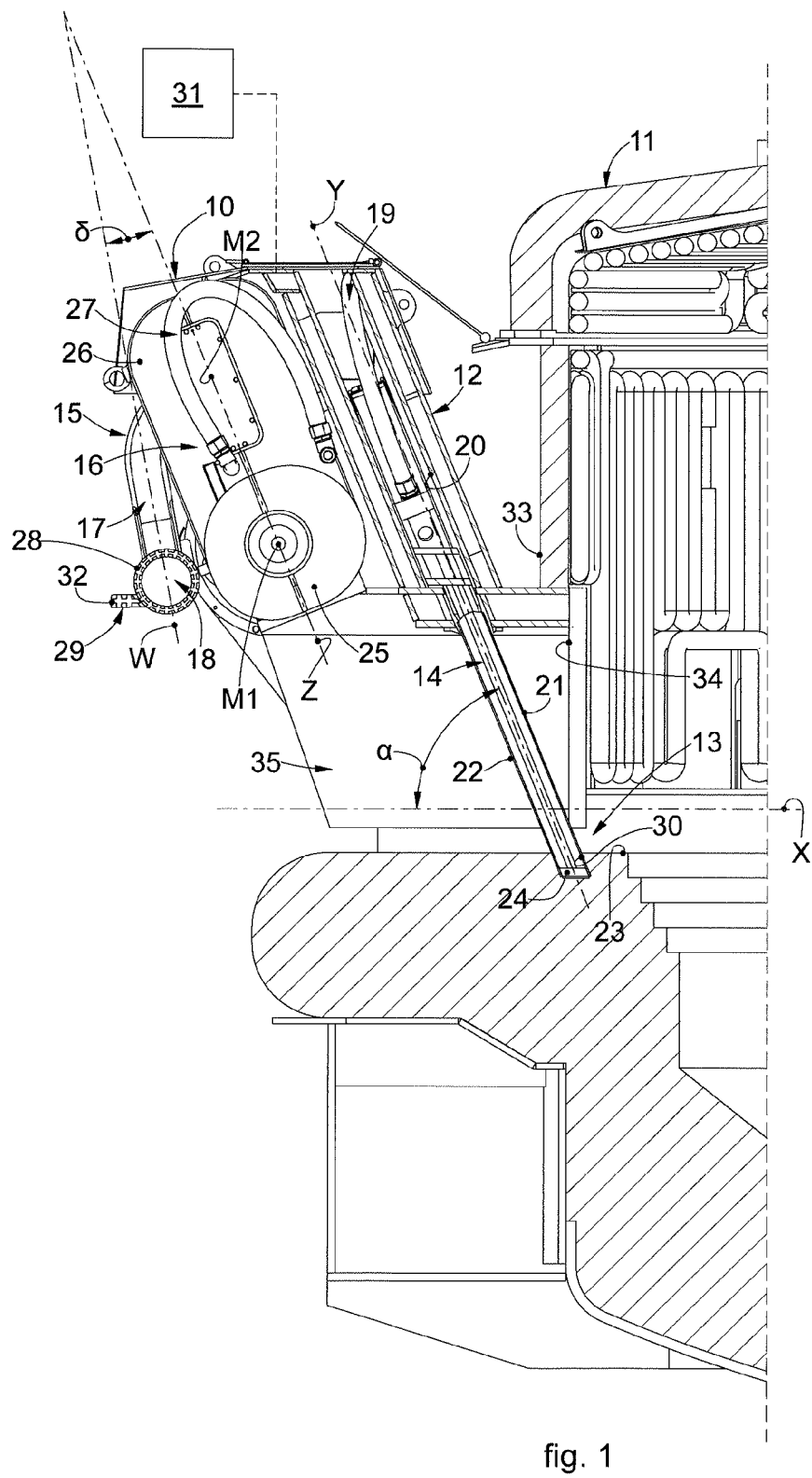
FIG. 1 is a partly sectioned view of a slag door of a melting furnace in a first configuration in accordance with the present invention.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

With reference to the attached drawings, these show a slag door 10 associated with an aperture 34 made in a lateral wall 33 of a melting furnace 11 for the production of steel from scrap. The slag door 10 is disposed in substantial correspondence with a slag channel 13, present, or provided, inside the melting furnace 11, through which part of the slag that covers the molten metal is discharged.

The slag door 10 can be used, as well as for the removal of at least part of the slag layer which is generated above the mass of molten metal during the process of melting the scrap, also for inserting additive materials during the process, useful for the correct melting of the scrap and/or for taking samples.

The melting furnace 11, schematically and partly shown in the attached drawings, is by way of a non-limiting example of the known type with electric arc (EAF—Electric Arc Furnace).

The slag door 10 is provided with a frame 12, preferably monoblock, comprising at the bottom a box-like base 35 which, during use, substantially aligns at the bottom with a base surface 23 of the slag channel 13. In particular, the slag channel 13 is lined with refractory material.

The slag door 10 can be easily installed in, and possibly removed from, the melting furnace 11 by moving the frame 12 respectively toward and away from the melting furnace 11.

The slag door 10 comprises, substantially mounted in a single body on the frame 12:

a sliding closing panel 14 associated with the frame 12 and configured to move selectively from a raised opening position, for the discharge of the slag, or for the other functions indicated above, to a lowered closing position to selectively seal the slag channel 13, or to any intermediate position according to needs;

a slag removal device 15, mounted on the frame 12 and mobile with respect to it, provided with at least a cleaning arm 17 having at its end a cleaning element 18 configured to travel, along a working axis X, the entire slag channel 13 when the closing panel 14 is in the raised opening position.

The slag removal device 15 has a working operating position, when the sliding closing panel 14 is in the raised opening position, in which the cleaning element 18 can penetrate through the aperture 34 present on the lateral wall 33 of the melting furnace 11 and along the slag channel 13; it also has an inactive position in which it is disposed completely behind the closing panel 14, with respect to the wall of the melting furnace 11, and in a raised position of non-interference with the bulk of the aperture in the lateral wall of the furnace 11.

In the embodiment shown, the slag removal device 15 is provided with a movement arm 16 hinged on one side to the frame 12 and on the other to the cleaning arm 17, thus defining a double articulation type movement, although the hypothesis of having a movement obtained by articulations divided into a number greater than two is also valid. Advantageously, the double articulation facilitates and improves the movement of the cleaning element 18 inside the slag channel 13.

According to one embodiment, the closing panel 14 is configured to be selectively housed retracted from the frame 12 in its raised opening position.

However, it is within the scope of the present invention to provide the cleaning arm 17 as a single element directly hinged to the frame 12 and rotating with respect thereto between the two working and inactive positions.

Furthermore, in the lowered position of the closing panel 14, a lower part of the closing panel 14 is configured to abut on the base surface 23 of the slag channel 13.

In the raised opening position, the closing panel 14 is partly or completely retracted in the frame 12, allowing the discharge of the slag through the slag channel 13.

The passage from the lowered closing position to the raised opening position, and vice versa, of the closing panel 14 can be commanded manually or automatically by means of a command and control unit 31.

According to one embodiment, the closing panel 14 is disposed along a sliding axis Y inclined by an angle of inclination a with respect to the working axis X. This angle of inclination a can be comprised between 45° and 85°.

Advantageously, this inclination and this retracting sliding movement of the closing panel 14 facilitate the removal of possible encrustations which can form on the base surface 23 of the slag channel 13 during the process of melting the scrap.

In addition, during the charging and start-of-melting step, the scrap pushes on the closing panel 14 further promoting the closing of the door and further limiting the possible entry of air from the outside.

In particular, the frame 12 is provided with a seating 20 provided to accommodate the closing panel 14 sliding along the sliding axis Y when the slag channel 13 is opened.

This closing panel 14 can be of the shutter or guillotine type.

In some embodiments, the seating 20 can be provided with means that facilitate the removal of the slag possibly encrusted on the closing panel 14 when the latter passes from the lowered position in which the slag channel 13 is closed to the raised position in which the slag channel 13 is open.

Furthermore, the slag door 10 can comprise a motorization member (not shown) associated with the closing panel 14 in order to selectively command the sliding movement of the closing panel 14 inside the frame 12.

According to one embodiment, the frame 12 can be provided with first cooling means 19 to cool the closing panel 14 with water, thus ensuring the correct functioning thereof in the conditions of high functioning temperatures of the melting furnace 11.

In particular, the closing panel 14 can be provided with internal channels for the passage of water by means of the first cooling means 19.

With reference to the attached drawings, the first cooling means 19 can for example be pipes connected directly to the closing panel 14.

According to one embodiment, the closing panel 14 can be provided with at least two metal layers 21, 22 wherein:

a first metal layer 21, having a high thermal conductivity, is provided on the internal side of the closing panel 14 facing toward the melting furnace 11 so as not to create a discontinuity in the distribution of temperatures inside the melting furnace 11 and increase it efficiency;

a second metal layer 22, having a high mechanical strength, is provided on the external side of the closing panel 14 opposite the internal side in order to ensure structural solidity to the closing panel 14 itself.

According to one embodiment, the first metal layer 21 is made of copper.

According to one embodiment, the second metal layer 22 is made of steel.

According to one embodiment, the two metal layers 21, 22 are overlapping and suitably constrained to each other to form a bimetallic closing panel 14.

Figure 3:
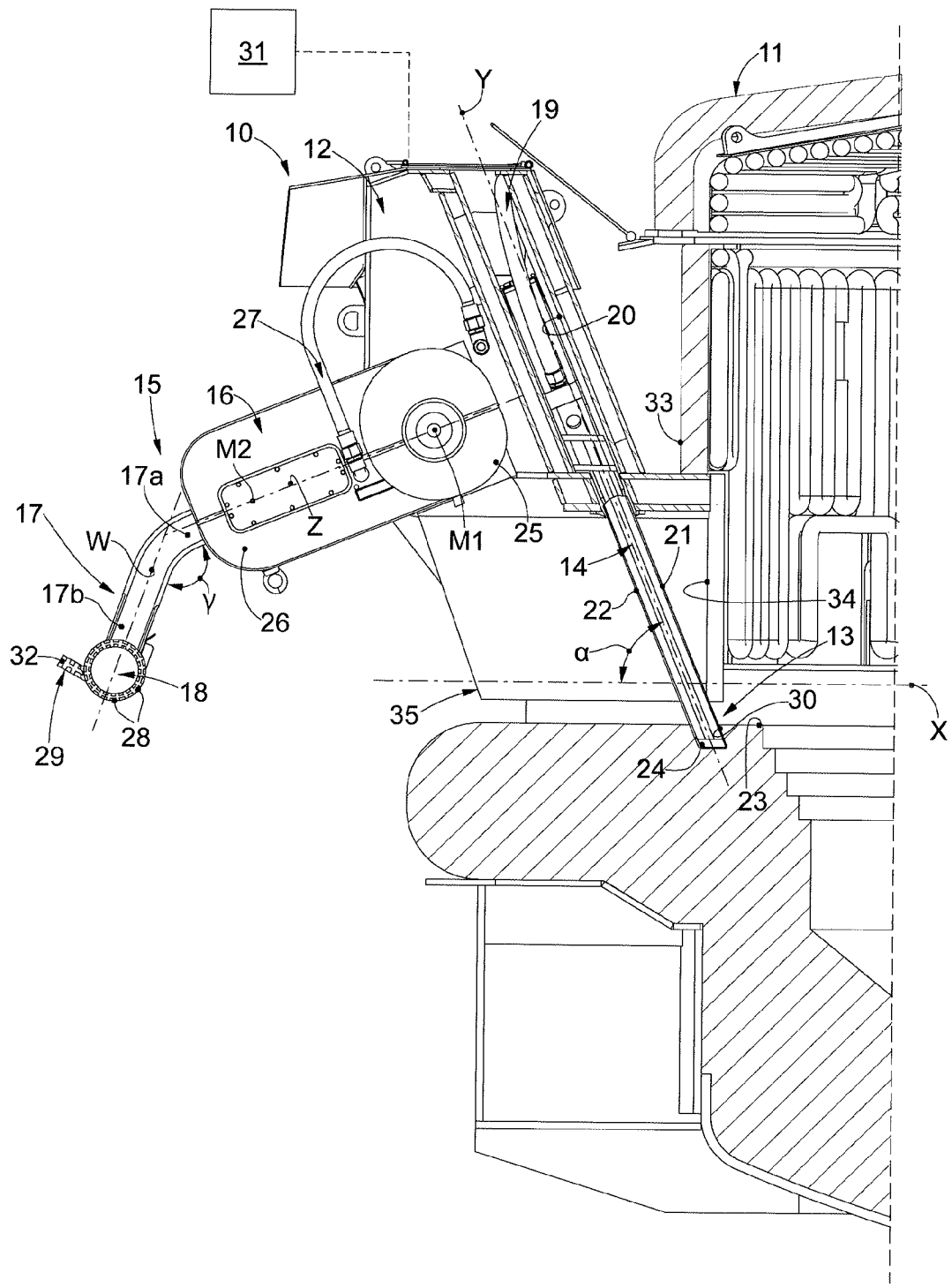
FIG. 3 is a partly sectioned view of the slag door of FIG. 1 in a third configuration.

According to one embodiment, as shown by way of example in FIGS. 1 and 3, the closing panel 14 has a greater length, also taking into account the inclination described above, than the size in height of the aperture 34 of the lateral wall 33 of the melting furnace 11.

This allows to always guarantee a correct and complete closure of the slag channel 13, even in conditions where the base surface 23 of the slag channel 13 is worn as a result of the repeated operating cycles of the melting furnace 11. In particular, the lower part of the closing panel 14 can be inserted, when it is in the closing position, in a suitable reception seating 30 provided on the base surface 23 of the slag channel 13, thus guaranteeing a hermetic and more secure seal of the slag channel 13.

According to one embodiment, the closing panel 14 is provided with a pressure transducer 24 which detects when the closing panel 14 is in abutment on the base surface 23 of the slag channel 13 so as to always guarantee a correct seal of the slag channel 13 in the lowered closing position of the closing panel 14.

As an alternative to the pressure transducer 24, another type of sensor can be present, for example a contact, proximity, optical, magnetic sensor, etc.

According to one embodiment, with reference to FIG. 1, in the inactive operating position, the cleaning arm 17 is folded over the movement arm 16, and they are both recessed in the frame 12 in a configuration of minimum bulk, at the back of the closing panel 14 with respect to the lateral wall 33 of the melting furnace 11.

In particular, in the inactive operating position, the entire slag removal device 15 moves to a raised position completely above the bulk of the aperture 34 present in the lateral wall 33 of the melting furnace 11.

Consequently, the slag removal device 15 does not obstruct the slag channel 13 during sampling operations, operations of inspection of the inside of the melting furnace 11, or insertion of additive materials in the melting of the scrap when the closing panel 14 is in the position in which the slag channel 13 is open. This configuration of minimum bulk therefore allows a selective and easy accessibility toward the inside of the melting furnace 11. Furthermore, the slag removal device 15 is not dirtied or contaminated by the slag extracted from the melting furnace 11.

According to one embodiment, the slag removal device 15, in the inactive operating position, is recessed in the frame 12 in a configuration of minimum bulk parallel to the sliding axis Y.

According to one embodiment, in the inactive operating position the cleaning arm 17 can possibly enter retracted into the movement arm 16 in a suitable seating provided inside the movement arm 16.

According to another embodiment, in the inactive operating position the cleaning arm 17 can be rotated until it rest along the movement arm 16.

Figure 2:
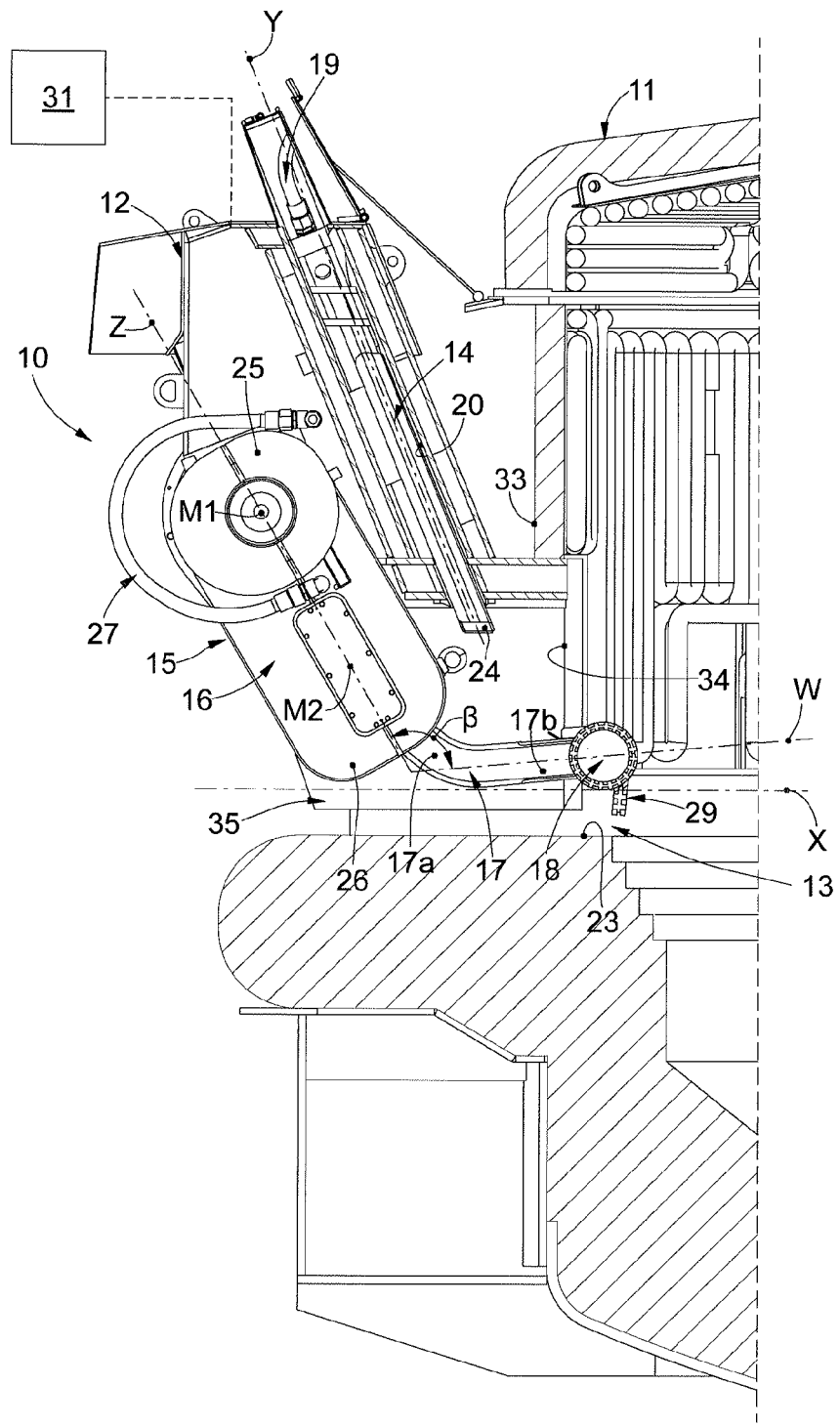
FIG. 2 is a partly sectioned view of the slag door of FIG. 1 in a second configuration.

According to one embodiment, with reference to FIG. 2, in the working operating position the movement arm 16 is rotated inside the slag channel 13 and the cleaning arm 17 is rotated with respect to the movement arm 16 so as to be able to enter into the slag channel 13 when the closing panel 14 is in the raised position in which the slag channel 13 is open.

According to one embodiment, the movement arm 16 hinged to the frame 12 rotates with respect to a first hinging axis M1 integral with the frame 12.

According to one embodiment, the cleaning arm 17 hinged to the movement arm 16 rotates with respect to a second hinging axis M2 not constrained to the frame 12.

According to one embodiment, the first hinging axis M1 of the movement arm 16 is parallel to the second hinging axis M2 of the cleaning arm 17.

In particular, the movement arm 16 of the slag removal device 15 has a first end 25 hinged to the frame 12, in correspondence with the first axis M1, above the slag channel 13, and a second end 26 opposite the first end 25.

The movement arm 16 can rotate around the first hinging axis M1 assuming a plurality of intermediate positions starting from the inactive operating position to a position of maximum rotation in which the movement arm 16 is disposed substantially close to the aperture 34 in the lateral wall 33 of the melting furnace 11, inside the slag channel 13.

According to one embodiment, the maximum angle of rotation of the movement arm 16, from the inactive operating position to the position of maximum rotation, can be comprised between 0° and 200°.

According to one embodiment, the rotation around the first hinging axis M1 of the first end 25 of the movement arm 16 can be commanded by one or more motor members (not shown).

According to one embodiment, the rotation around the first hinging axis M1 of the first end 25 of the movement arm 16 can be commanded manually or automatically by means of the command and control unit 31.

According to one embodiment, the cleaning arm 17 is hinged to the second end 26 of the movement arm 16 in correspondence with the second hinging axis M2.

According to one embodiment, the cleaning arm 17 rotates with respect to the movement arm 16 so as to always guarantee the correct positioning of the cleaning element 18 in the slag channel 13.

According to one embodiment, the reciprocal rotation between the cleaning arm 17 and the movement arm 16 can be commanded by the command and control unit 31 automatically and in a manner that is safe for the operators.

Advantageously, the slag removal device 15 allows a complete and effective cleaning of the slag channel 13, thanks to the combined configuration of the closing panel 14 and of the hingings of the movement arm 16 and of the cleaning arm 17; furthermore, the drive of the slag door 10 does not need to wait for the temperature of the slag channel 13 to decrease, consequently there are no downtimes and the melting furnace 11 can function continuously guaranteeing a high productivity. Furthermore, it is also possible to carry out the cleaning of the slag channel 13 while the furnace 11 is tapping. This operation is in fact performed by tilting the shell in order to facilitate the outflow of the steel and, therefore, lifting the slag door 10 with respect to the plane on which the melting furnace 11 is installed. In this position, it is not possible to act with manual cleaning systems, while the slag removal device 15 object of the present invention can be effectively used also in this step of the process.

Advantageously, the shape of the cleaning arm 17 is suitable to be folded over the movement arm 16 in the inactive configuration so as to reduce the bulk and not obstruct the slag channel 13.

According to one embodiment, the cleaning arm 17 can be L or J-shaped.

According to one embodiment, the cleaning arm 17 can have a knee bend.

According to one embodiment, the cleaning arm 17 has a pivoting portion 17a hinged to the movement arm 16 and an oblong portion 17b provided angled with respect to the pivoting portion 17a by an angle γ comprised between 100° and 140° to define the L or J shape as above.

The oblong portion 17b is integrally connected on one side to the pivoting portion 17a and on the other side to the cleaning element 18.

According to one embodiment, the oblong portion 17b has a greater length than the pivoting portion 17a.

According to one embodiment, the oblong portion 17b is made in a single body with the pivoting portion 17a.

According to one embodiment, the oblong portion 17b has a rectilinear development along an axis W inclined by the angle γ with respect to the pivoting portion 17a.

According to one embodiment, the axis W of the oblong portion 17b is substantially parallel to the working axis X when the slag removal device 15 is in the working operating position.

According to one embodiment, the length of the oblong portion 17b is comprised between 0.3 and 0.8 times the length of the slag channel 13 so that the cleaning arm 17 is able to guarantee a complete and optimal cleaning of the slag channel 13.

According to one embodiment, the longitudinal axis Z of the movement arm 16 and the axis W of the oblong portion 17b of the cleaning arm 17, in the inactive operating position of the slag removal device 15, can be inclined by a rest angle δ comprised between 0° and 15°.

According to one embodiment, the slag removal device 15 and the movement arm 16, in the working operating position of the slag removal device 15, assume a plurality of reciprocal rotation positions to allow the cleaning element 18 to retain the slag and then drag it outside the slag channel 13 along the working axis X, from the inside of the melting furnace 11 toward the outside along the slag channel 13.

According to one embodiment, the plurality of reciprocal rotation positions is defined by an angle of reciprocal rotation β comprised between the longitudinal axis Z of the movement arm 16 and the axis W of rectilinear development of the oblong portion 17b of the cleaning arm 17.

According to one embodiment, the angle of reciprocal rotation β can vary between 50° and 120°.

According to one embodiment, the frame 12 can be provided with second cooling means 27 for cooling the slag removal device 15 following the high temperatures to which the slag removal device 15 itself is subjected when it is in the working configuration.

These second cooling means 27 can comprise pipes connected on one side to the frame 12 and on the other side to the movement arm 16 and configured to spray the movement arm 16 with water.

Furthermore, the second cooling means 27 can comprise internal channels in the movement arm 16, in the cleaning arm 17 and in the cleaning element 18 so that the water can be distributed along the entire slag removal device 15.

According to one embodiment, the cleaning arm 17 can be disassembled from the movement arm 16 for maintenance operations.

For example, the disassembly of the cleaning arm 17 with respect to the movement arm 16 can be easily carried out when they are in a maintenance position.

A possible maintenance position is shown in FIG. 3, in which the slag removal device 15 is disposed outside the frame 12 and the slag channel 13, and the pivoting portion 17a of the cleaning arm 17 is substantially aligned with the longitudinal axis Z of the movement arm 16.

In this way, maintenance interventions are simplified and accelerated in order to increase the productivity of the melting furnace, preventing excessive downtimes even during maintenance operations.

According to one embodiment, the cleaning element 18 can have an oblong shape of a size equal to or slightly less than the width, transverse to the working axis X, of the aperture 34 of the melting furnace 11 so as to remove the slag along the entire width of the base surface 23 of the slag channel 13.

According to one embodiment, the cleaning element 18 can have a plurality of scraping teeth 28 to facilitate the removal of the encrustations in the slag channel 13.

According to one embodiment, the cleaning element 18 can have a protruding component 29 configured to retain and remove the slag accumulated on the base surface 23 of the slag channel 13 along the working axis X.

In particular, the protruding component 29 faces toward the base surface 23 of the slag channel 13 when the slag removal device 15 is in the working configuration.

This protruding component 29 can be a plate that affects the entire length of the cleaning element 18.

This protruding component 29 can comprise a plurality of protruding teeth 32 in order to remove at the same time the slag from the slag channel 13 and the encrustations from the base surface 23 of the slag channel 13.

This protruding component 29 can be disposed inclined between 45° and 90° with respect to the cleaning element 18 in order to better retain the slag to be removed, performing a function similar to that of a rake.

According to one embodiment, the cleaning element 18 can rotate around a longitudinal axis thereof parallel to the base surface 23 of the slag channel 13 so as to better facilitate the removal of the encrustations present in the walls of the slag channel 13 and in particular on the base surface 23 thereof.

This rotation can be independent of the reciprocal rotation of the cleaning arm 17 and the movement arm 16.

This rotation can occur around an axis parallel to the hinging axis of the movement arm 16 to the frame 12.

This rotation can be commanded by the command and control unit 31 on the basis of the level of encrustations and obstructions of the slag channel 13.

According to one embodiment, the cleaning element 18 can have a cylindrical cross section.

According to one embodiment, the cleaning element 18 can have a polygonal or star-shaped cross section to facilitate the removal of the slag and encrustations.

According to one embodiment, the cleaning element 18 can be disassembled from the cleaning arm 17 for maintenance or replacement operations.

This operation can be carried out in a suitable maintenance position of the slag removal device 15, such as that shown in FIG. 3.

It is clear that modifications and/or additions of parts may be made to the slag door 10 as described heretofore, without departing from the field and scope of the present invention.

It is also clear that, although the present invention has been described with reference to some specific examples, a person of skill in the art shall certainly be able to achieve many other equivalent forms of slag door 10, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A slag door for a melting furnace for the production of steel, the slag door suitable to be associated with an aperture provided in a lateral wall of the melting furnace and to cooperate with a slag channel provided inside the melting furnace, the slag door comprising:
   a frame on which a sliding closing panel is mounted, the frame configured to selectively assume a lowered position to close said slag channel, in which a lower part of the closing panel substantially abuts a base surface of the slag channel, and a raised position to open said slag channel in which the closing panel is partly or completely raised; and
   a slag removal device, mounted on and movable relative to said frame the slag removable device comprising a cleaning arm having at its end a cleaning element configured to be moved inside the slag channel when the closing panel is in the raised position; said slag removal device having a working operating position, when the sliding closing panel is located in the raised opening position, in which the cleaning element moves until it penetrates through the aperture of the melting furnace along the slag channel and exerts a cleaning and descaling action on the slag present in said slag channel, and an inactive operating position in which the sliding closing panel is raised and outside the bulk of said aperture of the melting furnace,
   wherein the slag removal device further comprises a movement arm having a first end hinged to the frame and a second end hinged to the cleaning arm, thereby defining a double articulation arm.

2. The slag door as in claim 1, wherein said closing panel is disposed along a sliding axis inclined by an angle of inclination comprised between 45° and 85° with respect to a working axis of the slag removable device.

3. The slag door as in claim 1, wherein said closing panel is provided with a pressure transducer configured to detect when the closing panel is substantially abutting on the base surface of the slag channel in the lowered closing position.

4. The slag door as in claim 1, wherein said closing panel is provided with at least two metal layers in which:
   a first metal layer is provided on the internal side of the closing panel facing toward the melting furnace;
   a second metal layer is provided on the external side of the closing panel opposite the internal side, the second metal layer being different from the first metal layer.

5. The slag door as in claim 1, wherein said cleaning arm has a pivoting portion hinged to the movement arm and an oblong portion angled with respect to the pivoting portion at an angle between 100° and 140° to define a shape of the cleaning arm like an L or a J.

6. The slag door as in claim 5, wherein said movement arm and said cleaning arm, in the working operating position of the slag removal device, are suitable to assume a plurality of reciprocal rotation positions with an angle of reciprocal rotation between a longitudinal axis of the movement arm and an axis of rectilinear development of the oblong portion of the cleaning arm that varies between 50° and 120°.

7. The slag door as in claim 1, wherein said cleaning element has an oblong shape with a size equal to or slightly less than the width of the aperture of the melting furnace.

8. The slag door as in claim 1, wherein said cleaning element has a plurality of scraping teeth to facilitate the removal of encrustations in the slag channel.

9. The slag door as in claim 1, wherein said cleaning element is rotatable around a longitudinal axis thereof, parallel to the base surface of the slag channel.

10. A melting furnace for the production of steel, the melting furnace comprising:
    lateral walls;
    an aperture in one of the lateral walls;
    a slag channel associated with said aperture and extending toward the inside of said melting furnace; and
    a slag door as in claim 1, the slag door configured to cooperate with said slag channel.

11. A method to clean and remove slag from a slag channel of a melting furnace for the production of steel through a slag door as defined in claim 1, wherein said method provides to clean and remove the slag by means of the slag removal device during a steel tapping step.

12. The slag door as in claim 1, wherein said closing panel has a length that is greater than a height of the aperture of the lateral wall of the melting furnace.

13. The slag door as in claim 4, wherein the first metal layer has a higher thermal conductivity than the second metal layer.

14. The slag door as in claim 4, wherein the second metal layer has a higher mechanical strength than the first metal layer.

15. The slag door as in claim 4, wherein the first metal layer has a higher thermal conductivity than the second metal layer, and wherein the second metal layer has a higher mechanical strength than the first metal layer.

16. The slag door as in claim 5, wherein the oblong portion is integrally connected on one side to the pivoting portion and on the other side to the cleaning element.

17. A slag door for a melting furnace for the production of steel, the slag door suitable to be associated with an aperture provided in a lateral wall of the melting furnace and to cooperate with a slag channel provided inside the melting furnace, the slag door comprising:
    a frame on which a sliding closing panel is mounted, the frame configured to selectively assume a lowered position to close said slag channel, in which a lower part of the closing panel substantially abuts a base surface of the slag channel, and a raised position to open said slag channel in which the closing panel is partly or completely raised; and
    a slag removal device, mounted on and movable relative to said frame, the slag removable device comprising a cleaning arm having at its end a cleaning element configured to be moved inside the slag channel when the closing panel is in the raised position; said slag removal device having a working operating position, when the sliding closing panel is located in the raised opening position, in which the cleaning element moves until it penetrates through the aperture of the melting furnace along the slag channel and exerts a cleaning and descaling action on the slag present in said slag channel, and an inactive operating position in which the sliding closing panel is raised and outside the bulk of said aperture of the melting furnace,
    wherein the slag removal device is hinged to the frame, and
    wherein said closing panel is provided with a pressure transducer configured to detect when the closing panel is substantially abutting the base surface of the slag channel in the lowered closing position.

* * * * *